United States Patent
Pugh et al.

(10) Patent No.: US 10,192,227 B2
(45) Date of Patent: *Jan. 29, 2019

(54) MEASUREMENTS BASED ON PANEL AND CENSUS DATA

(71) Applicant: comScore, Inc., Reston, VA (US)

(72) Inventors: Brian Pugh, Sterling, VA (US); Frank Eugene Pecjak, Fairfax, VA (US)

(73) Assignee: comScore, Inc., Reston, VA (US)

(*) Notice: Subject to any disclaimer, the term of this patent is extended or adjusted under 35 U.S.C. 154(b) by 88 days.

This patent is subject to a terminal disclaimer.

(21) Appl. No.: 15/256,147

(22) Filed: Sep. 2, 2016

(65) Prior Publication Data

US 2016/0371710 A1      Dec. 22, 2016

Related U.S. Application Data

(63) Continuation of application No. 14/603,953, filed on Jan. 23, 2015, now Pat. No. 9,436,775, which is a
(Continued)

(51) Int. Cl.
*G06F 15/16* (2006.01)
*G06Q 30/02* (2012.01)
(Continued)

(52) U.S. Cl.
CPC ..... *G06Q 30/0201* (2013.01); *G06F 11/3466* (2013.01); *G06F 17/3089* (2013.01);
(Continued)

(58) Field of Classification Search
CPC ......... H04L 43/04; H04L 67/22; H04L 67/02; H04L 43/06; H04L 43/0876; H04L 61/00; H04L 67/306
See application file for complete search history.

(56) References Cited

U.S. PATENT DOCUMENTS 5,490,060 A    2/1996   Malec
7,039,699 B1   5/2006   Narin
(Continued)

FOREIGN PATENT DOCUMENTS

EP        2071461        6/2009
JP        2007004564     1/2007
WO        WO1998026529   1/1999

OTHER PUBLICATIONS

European Office Action for Application No. 11766579.4, dated Nov. 25, 2016, 9 pages.
(Continued)

*Primary Examiner* — Djenane M Bayard
(74) *Attorney, Agent, or Firm* — Baker & Hostetler LLP

(57) ABSTRACT

A first set of usage data for a first set of resources on a network and a second set of usage data for a second set of resources on a network are accessed. The first set of resources were accessed by a first group of client systems and the first set of usage data is determined based on information received from the first group of client systems sent as a result of beacon instructions included with the first set of resources. The second set of usage data is determined based on information received from monitoring applications installed on a second group of client systems that accessed the second set of resources. Users of the second group of client systems are a sample of a larger group of users that use resources on the network. Initial usage measurement data for a third set of resources on the network is determined based on the first set of usage data. The third set includes one or more common resources that are included in the first set of resources and the second set of resources. One or more adjustment factors are determined based on the second set of usage data and applied to the initial usage measurement data to generate adjusted usage measurement data. One or more
(Continued)

reports are generated based on the adjusted usage measurement data.

17 Claims, 7 Drawing Sheets

Related U.S. Application Data continuation of application No. 14/147,722, filed on Jan. 6, 2014, now Pat. No. 8,996,696, which is a continuation of application No. 12/871,385, filed on Aug. 30, 2010, now Pat. No. 8,626,901.

(60) Provisional application No. 61/328,909, filed on Apr. 28, 2010, provisional application No. 61/320,953, filed on Apr. 5, 2010.

(51) Int. Cl.
    *G06F 17/30*     (2006.01)
    *G06F 11/34*     (2006.01)
    *H04L 12/26*     (2006.01)
    *H04L 29/06*     (2006.01)
    *H04L 29/08*     (2006.01)

(52) U.S. Cl.
    CPC ............. *H04L 43/06* (2013.01); *H04L 63/10* (2013.01); *H04L 67/22* (2013.01); *H04L 67/42* (2013.01); *H04L 67/02* (2013.01)

(56) References Cited

U.S. PATENT DOCUMENTS

| | | | |
|---|---|---|---|
| 7,376,722 | B1 | 5/2008 | Sim |
| 7,474,617 | B2 | 1/2009 | Molen |
| 7,523,191 | B1 | 4/2009 | Thomas |
| 8,321,509 | B2 | 11/2012 | Jennings et al. |
| 8,495,065 | B2 | 7/2013 | Petersen et al. |
| 8,560,675 | B2 | 10/2013 | Honnold et al. |
| 8,626,901 | B2 | 1/2014 | Pugh |
| 2003/0023715 | A1 | 1/2003 | Reiner |
| 2004/0019518 | A1 | 1/2004 | Abraham et al. |
| 2004/0243704 | A1 | 12/2004 | Botelho |
| 2007/0299964 | A1 | 12/2007 | Wong |
| 2008/0052392 | A1 | 2/2008 | Webster |
| 2008/0086741 | A1* | 4/2008 | Feldman ............... G06Q 30/02 725/13 |
| 2009/0216882 | A1 | 8/2009 | Britton |
| 2011/0004682 | A1 | 1/2011 | Honnold et al. |
| 2011/0087780 | A1 | 4/2011 | McCann et al. |
| 2012/0078708 | A1 | 3/2012 | Taylor |
| 2012/0110062 | A1 | 5/2012 | Savage |
| 2012/0239809 | A1 | 9/2012 | Mazumdar |
| 2014/0195674 | A1 | 7/2014 | Pugh |

OTHER PUBLICATIONS

European Search Report for Application No. 11766579.4, dated Oct. 31, 2016, 5 pages.
Notice of Allowance issued in U.S. Appl. No. 14/603,953 dated May 3, 2016, 7 pages.
Office Action issued in U.S. Appl. No. 14/603,953 dated May 14, 2015, 14 pages.
Briggs, Rex et al., "The Ecological Inference Problem in Internet Measurement: Leveraging Web Site Log Files to Uncover Population Demographics and Psychographics," Supplied by the British Library—The world's knowledge, 19 pages.
Coffee, Steve, "Internet Audience Measurement: A Practitioner's View," Journal of Interactive Advertising, ISSN 1525-2019, vol. 1, No. 2, Spring 2001, pp. 10-17.
Kalyanam, Kirthi et al., "Data Reconciliation, Reducing Discrepancies in Audience Estimates From Web Servers and Online Panels," IAB/ARF/FAST Summit Measurement Committees, Oct. 4, 1999, 39 pages.
Sternstein et al, "Digital Planet announces creation of Netcount; 'Nielsens for the Net' creates vast new marketing potential for World Wide Web," Business Wire, Apr. 19, 1995, 2 pages.
PCT Notification of Transmittal of the International Search Report and the Written Opinion of the International Search Authority for Application No. PCT/US 11/31206, 19 pages.
International Preliminary Report on Patentability in International Application No. PCT/US2011/031206, dated Oct. 18, 2012, 11 pages.
Australian Office Action issued in Application No. 2011238471 dated Aug. 20, 2014, 2 pages.
Office Action issued in U.S. Appl. No. 12/871,385 dated Jan. 18, 2013, 24 pages.
Notice of Allowance issued in U.S. Appl. No. 12/871,385 dated Aug. 30, 2013, 8 pages.
Office Action issued in U.S. Appl. No. 14/147,722 dated Jul. 18, 2014, 11 pages.
Notice of Allowance issued in U.S. Appl. No. 14/147,722 dated Dec. 24, 2014, 10 pages.
Japanese Office Action issued in Application No. 2013-503832 dated Apr. 28, 2015 (with English Translation), 5 pages.
Canadian Office Action issued in Application No. 2,795,165 dated Jul. 7, 2015, 2 pages.

\* cited by examiner

MEASUREMENTS BASED ON PANEL AND CENSUS DATA

CROSS-REFERENCE TO RELATED APPLICATIONS

This application is a continuation of U.S. application Ser. No. 14/603,953 filed on Jan. 23, 2015 and titled "MEASUREMENTS BASED ON PANEL AND CENSUS DATA", which is a continuation of U.S. application Ser. No. 14/147,722 filed on Jan. 6, 2014 and titled "MEASUREMENTS BASED ON PANEL AND CENSUS DATA", which is a continuation of U.S. application Ser. No. 12/871,385 filed on Aug. 30, 2010 and titled "MEASUREMENTS BASED ON PANEL AND CENSUS DATA", which claims priority to U.S. Provisional Application Ser. No. 61/328,909 filed on Apr. 28, 2010 and titled "MEASUREMENTS BASED ON PANEL AND CENSUS DATA", and U.S. Provisional Application Ser. No. 61/320,953, filed on Apr. 5, 2010 and titled "MEASUREMENTS BASED ON PANEL AND CENSUS DATA," all of which are incorporated by reference in their entirety.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one aspect, a system includes one or more processing devices and one or more storage devices storing instructions. The instructions, when executed by the one or more processing devices, cause the one or more processing devices to access a first set of usage data for a first set of resources on a network. The first set of resources were accessed by a first group of client systems and the first set of usage data is determined based on information received from the first group of client systems sent as a result of beacon instructions included with the first set of resources. The instructions also cause the one or more processing devices to access a second set of usage data for a second set of resources on a network. The second set of usage data is determined based on information received from monitoring applications installed on a second group of client systems that accessed the second set of resources. Users of the second group of client systems are a sample of a larger group of users that use resources on the network. Further, the instructions cause the one or more processing devices to determine initial usage measurement data for a third set of resources on the network based on the first set of usage data, wherein the third set includes one or more common resources that are included in the first set of resources and the second set of resources; determine one or more adjustment factors based on the second set of usage data; apply the one or more adjustments factors to the initial usage measurement data to generate adjusted usage measurement data; and generate one or more reports based on the adjusted usage measurement data.

Implementations may include one or more of the following features. For example, the information received from the first group of client systems may include, for each of the client systems in the first group that accessed the common resources, one or more beacon messages that identify the common resources and that include a beacon cookie with a unique identifier for the client system. To determine the initial usage measurement data, the instructions may include instructions that, when executed, cause the one or more processing devices to determine an initial count of unique visitors that accessed the third set of resources during a time period by determining a count of the received beacon messages that identify the common resources and that include beacon cookies with different unique identifiers.

The one or more adjustment factors may include a cookie-per-person adjustment factor that reflects a number of beacon cookies per person that accessed the common resources during the time period. To determine the cookie-per-person adjustment factor, the instructions may include instructions that cause the one or more processing devices to determine a ratio of a projected total number of cookies set on client systems that accessed the common resources during the time period to a projected total number of people that accessed the common resources during the time period.

The one or more adjustment factors may include a person-per-cookie adjustment factor that reflects a number of persons that accessed the common resources during the time period per beacon cookies. To determine the person-per-cookie adjustment factor, the instructions may include instructions that cause the one or more processing devices to determine a ratio of a projected total number of people that accessed the common resources during the time period to a projected total number of cookies set on client systems that accessed the common resources during the time period.

The one or more adjustment factors may include a machine overlap adjustment factor that reflects a number of client systems that were used to access the common resources during the time period per person that accessed the common resources during the time period. To determine the machine overlap adjustment factor, the instructions may include instructions that cause the one or more processing devices to determine the machine overlap factor based, at least in part, on an incremental number of client systems per person used by people that accessed the common resources during the time period, a frequency of accesses per person that accessed the common resources during the time period, and an average number of accesses to the common resources per day during the time period. The incremental number of client systems per person may be determined based on a ratio of a total number of client systems that accessed the common resources during the time period to a total number of people that accessed the common resources during the time period.

The one or more adjustment factors may include a non-beaconed adjustment factor that reflects a number of unique visitors that accessed one or more resources in the third set of resources that are included in the second set of resources but not included in the first set of resources. To determine the non-beaconed adjustment factor, the instructions may include instructions that cause the one or more processing devices to determine a projected number of unique visitors that accessed the third set of resources, determine a projected number of unique visitors that accessed the common resources, and subtract the projected number of unique visitors that accessed the common resources from the projected number of unique visitors that accessed the third set of resources.

To determine the initial usage measurement data, the instructions may include instructions that, when executed, cause the one or more processing devices to determine an initial count of page views for the third set of resources during a time period by determining a total count of the beacon messages that identify the common resources. The one or more adjustment factors may include a non-beaconed adjustment factor that reflects a number of page views for one or more resources in the third set of resources that are included in the second set of resources but not included in the first set of resources.

In another aspect, a method includes accessing a first set of usage data for a first set of resources on a network. The first set of resources were accessed by a first group of client systems and the first set of usage data is determined based on information received from the first group of client systems sent as a result of beacon instructions included with the first set of resources. The method also includes accessing a second set of usage data for a second set of resources on a network. The second set of usage data is determined based on information received from monitoring applications installed on a second group of client systems that accessed the second set of resources. Users of the second group of client systems are a sample of a larger group of users that use resources on the network. Further, the method includes determining initial usage measurement data for a third set of resources on the network based on the first set of usage data, wherein the third set includes one or more common resources that are included in the first set of resources and the second set of resources; determining one or more adjustment factors based on the second set of usage data; applying the one or more adjustments factors to the initial usage measurement data to generate adjusted usage measurement data; and generating one or more reports based on the adjusted usage measurement data.

Implementations may include one or more of the following features. For example, the information received from the first group of client systems may include, for each of the client systems in the first group that accessed the common resources, one or more beacon messages that identify the common resources and that include a beacon cookie with a unique identifier for the client system. Determining the initial usage measurement data may include determining an initial count of unique visitors that accessed the third set of resources during a time period by determining a count of the received beacon messages that identify the common resources and that include beacon cookies with different unique identifiers.

The one or more adjustment factors may include a cookie-per-person adjustment factor that reflects a number of beacon cookies per person that accessed the common resources during the time period. Determining the cookie-per-person adjustment factor may include determining a ratio of a projected total number of cookies set on client systems that accessed the common resources during the time period to a projected total number of people that accessed the common resources during the time period.

The one or more adjustment factors may include a person-per-cookie adjustment factor that reflects a number of persons that accessed the common resources during the time period per beacon cookies. Determining the person-per-cookie adjustment factor may include determining a ratio of a projected total number of people that accessed the common resources during the time period to a projected total number of cookies set on client systems that accessed the common resources during the time period.

The one or more adjustment factors may include a machine overlap adjustment factor that reflects a number of client systems that were used to access the common resources during the time period per person that accessed the common resources during the time period. Determining the machine overlap adjustment factor may include determining the machine overlap factor based, at least in part, on an incremental number of client systems per person used by people that accessed the common resources during the time period, a frequency of accesses per person that accessed the common resources during the time period, and an average number of accesses to the common resources per day during the time period. The incremental number of client systems per person may be determined based on a ratio of a total number of client systems that accessed the common resources during the time period to a total number of people that accessed the common resources during the time period.

The one or more adjustment factors may include a non-beaconed adjustment factor that reflects a number of unique visitors that accessed one or more resources in the third set of resources that are included in the second set of resources but not included in the first set of resources. Determining the non-beaconed adjustment factor may include determining a projected number of unique visitors that accessed the third set of resources, determining a projected number of unique visitors that accessed the common resources, and subtracting the projected number of unique visitors that accessed the common resources from the projected number of unique visitors that accessed the third set of resources.

Determining the initial usage measurement data may include determining an initial count of page views for the third set of resources during a time period by determining a total count of the beacon messages that identify the common resources. The one or more adjustment factors may include a non-beaconed adjustment factor that reflects a number of page views for one or more resources in the third set of resources that are included in the second set of resources but not included in the first set of resources.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, webpage or other resource accesses by client systems may be recorded, and those accesses may be analyzed to develop audience measurement reports. Data about resource accesses can be collected using a panel-based approach. A panel-based approach generally entails installing a monitoring application on the client systems of a panel of users. The monitoring application then collects information about the webpage or other resource accesses and sends that information to a collection server.

Data about resource accesses can also be collected using a beacon-based approach. A beacon-based approach generally involves associating script or other code with the resource being accessed such that the code is executed when a client system renders or otherwise employs the resource. When executed, the beacon code sends a message to a collection server. The message includes certain information, such as an identifier of the resource accessed.

While panel-based data and beacon-based data can be used separately to produce audience measurement reports, the panel-based data and the beacon-based data can additionally, or alternatively, be used together to generate audience measurement reports. Using these data sets together may increase the accuracy of the reports. The following describes examples of systems implementing panel-based and beacon-based approaches to collecting data about resource accesses, and then describes examples of techniques for using the data collected from both approaches together to generate audience measurement reports.

Figure 1:
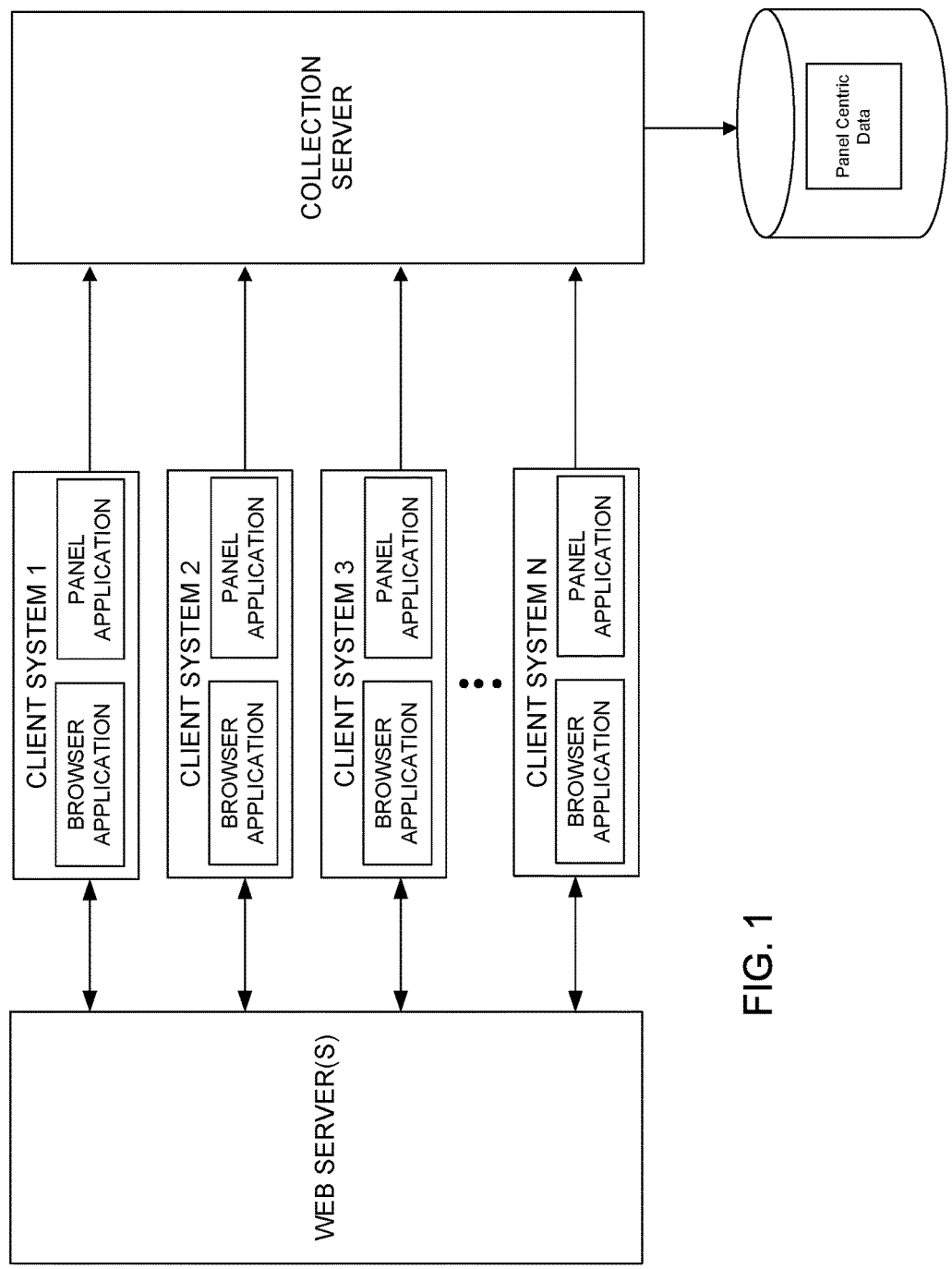
FIG. 1 illustrates an example of a system in which a panel of users may be used to perform Internet audience measurement.

FIG. 1 illustrates an example of a system 100 in which a panel of users may be used to collect data for Internet audience measurement. The system 100 includes client systems 112, 114, 116, and 118, one or more web servers 110, a collection server 130, and a database 132. In general, the users in the panel employ client systems 112, 114, 116, and 118 to access resources on the Internet, such as webpages located at the web servers 110. Information about this resource access is sent by each client system 112, 114, 116, and 118 to a collection server 130. This information may be used to understand the usage habits of the users of the Internet.

Each of the client systems 112, 114, 116, and 118, the collection server 130, and the web servers 110 may be implemented using, for example, a general-purpose computer capable of responding to and executing instructions in a defined manner, a personal computer, a special-purpose computer, a workstation, a server, or a mobile device. Client systems 112, 114, 116, and 118, collection server 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 112, 114, 116, and 118, collection server 130, and web servers 110.

In the example shown in FIG. 1, the system 100 includes client systems 112, 114, 116, and 118. However, in other implementations, there may be more or fewer client systems. Similarly, in the example shown in FIG. 1, there is a single collection server 130. However, in other implementations there may be more than one collection server 130. For example, each of the client systems 112, 114, 116, and 118 may send data to more than one collection server for redundancy. In other implementations, the client systems 112, 114, 116, and 118 may send data to different collection servers. In this implementation, the data, which represents data from the entire panel, may be communicated to and aggregated at a central location for later processing. The central location may be one of the collection servers.

The users of the client systems 112, 114, 116, and 118 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 112, 114, 116, and 118 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies The users in the panel may be recruited by an entity controlling the collection server 130, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, a monitoring application is installed on the user's client system. The monitoring application collects the information about the user's use of the client system to access resources on the Internet and sends that information to the collection server 130.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 100, a monitoring application 112b, 114b, 116b, and 118b, also referred to as a panel application, is installed on each of the client systems 112, 114, 116, and 118. Accordingly, when a user of one of the client systems 112, 114, 116, or 118 employs, for example, a browser application 112a, 114a, 116a, or 118a to visit and view web pages, information about these visits may be collected and sent to the collection server 130 by the monitoring application 112b, 114b, 116b, and 118b. For instance, the monitoring application may collect and send to the collection server 130 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system. The monitoring application also may collect and send information about the requests for resources and subsequent responses. For example, the monitoring application may collect the cookies sent in requests and/or received in the responses. The collection server 130 receives and records this information. The collection server 130 aggregates the recorded information from the client systems and stores this aggregated information in the database 132 as panel centric data 132a.

The panel centric data 132a may be analyzed to determine the visitation or other habits of users in the panel, which may be extrapolated to the larger population of all Internet users. The information collected during a particular usage period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or client systems) visiting certain web pages or groups of web pages, or unique visitors within a particular demographic visiting certain web pages or groups of web pages. This data may also be used to determine other estimates, such as the frequency of usage per user (or client system), average number of pages viewed per user (or client system), and average number of minutes spent per user (or client system).

As described further below, such estimates and/or other information determined from the panel centric data may be used with data from a beacon-based approach to generate reports about audience visitation or other activity. Using the panel centric data with data from a beacon-based approach may improve the overall accuracy of such reports.

Figure 2:
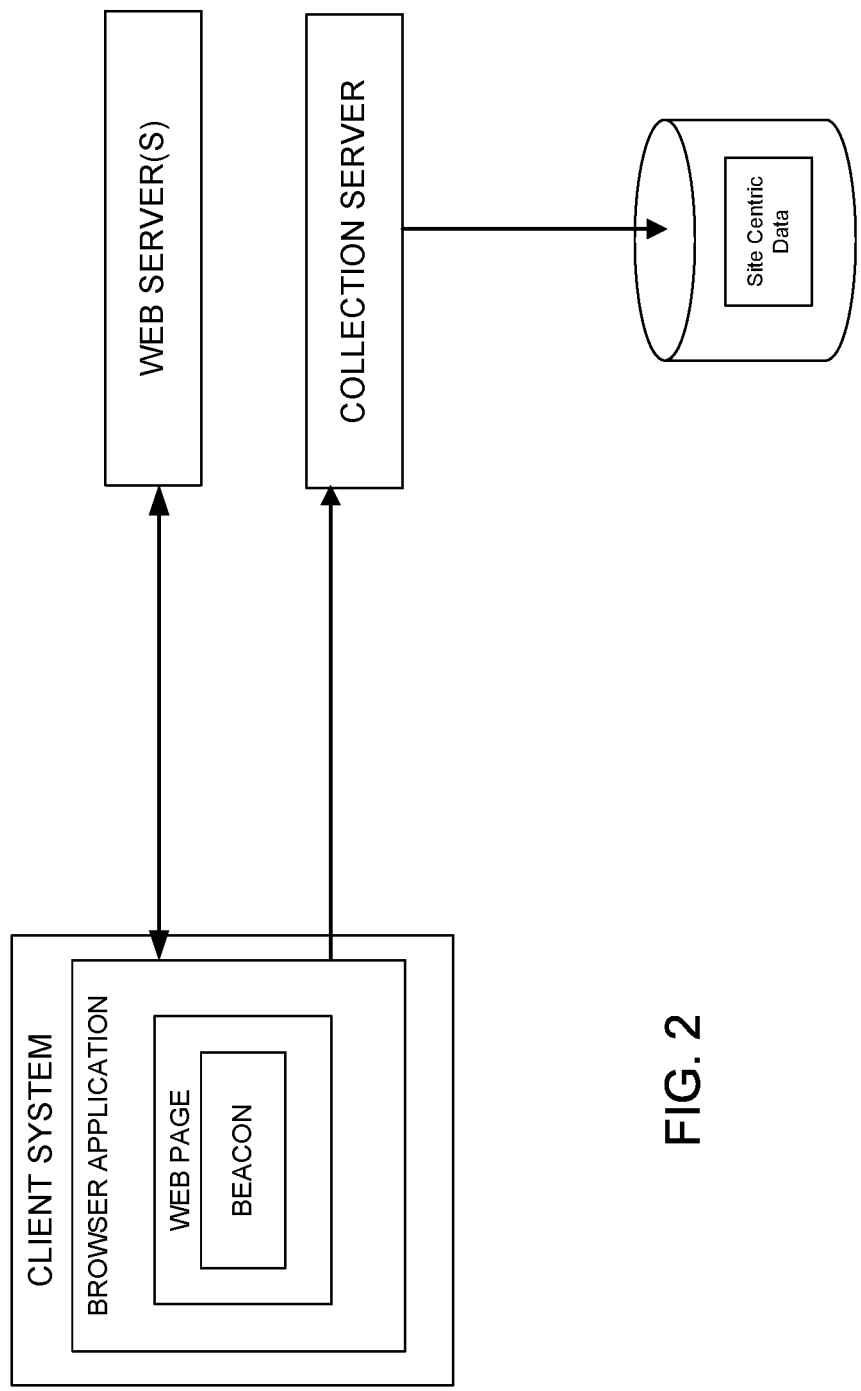
FIG. 2 illustrates an example of a system in which site centric data can be obtained by including beacon code in one or more web pages.

Referring to FIG. 2, a beacon-based approach may be implemented using a system 200. In general, a beacon-based approach may entail including beacon code in one or more web pages.

System 200 includes one or more client systems 202, the web servers 110, the collection servers 130, and the database 132. The client systems 202 can include client systems 112, 114, 116, or 118, which have the panel application installed on them, as well as client systems that do not have the panel application installed.

The client systems include a browser application 204 that retrieves web pages 206 from web servers 110 and renders the retrieved web pages. Some of the web pages 206 include beacon code 208. In general, publishers of web pages may agree with the entity operating the collection server 130 to include this beacon code in some or all of their web pages. This code 208 is rendered with the web page in which the code 208 is included. When rendered, the code 208 causes the browser application 204 to send a message to the collection server 130. This message includes certain information, such as the URL of the web page in which the beacon code 208 is included. For example, the beacon code may be JavaScript code that accesses the URL of the web page on which the code is included, and sends to the collection server 130 an HTTP Post message that includes the URL in a query string. Similarly, the beacon code may be JavaScript code that accesses the URL of the web page on which the code is included, and includes that in the URL in the "src" attribute of an <img> tag, which results in a request for the resource located at the URL in the "src" attribute of the <img> tag to the collection server 130. Because the URL of the webpage is included in the "src" attribute, the collection server 130 receives the URL of the webpage. The collection server 130 can then return a transparent image. The following is an example of such JavaScript:

```
<script type="text/javascript">
    document.write("<img id='img1' height='1'
width='1'>");document.getElementById("img1").
src="http://example.com/scripts/report.dll?C7=" +
escape(window.location.href) + "&rn=" +
Math.floor(Math.random( )*99999999);
</script>
```

The collection server 130 records the webpage URL received in the message with, for instance, a time stamp of when the message was received and the IP address of the client system from which the message was received. The collection server 130 aggregates this recorded information and stores this aggregated information in the database 132 as site centric data 132b.

The message may also include a unique identifier for the client system. For example, when a client system first sends a beacon message to the collection server 130, a unique identifier may be generated for the client system (and associated with the received beacon message). That unique identifier may then be included in a cookie that is set on that client system 102. As a result, later beacon messages from that client system may have the cookie appended to them such that the messages include the unique identifier for the client system. If a beacon message is received from the client system without the cookie (e.g., because the user deleted cookies on the client system), then the collection server 130 may again generate a unique identifier and include that identifier in a new cookie set of the client system.

Thus, as users of client systems 102 access webpages (e.g., on the Internet), the client systems 102 access the webpages that include the beacon code, which results in messages being sent to the collection server 130. These messages indicate the webpage that was accessed (e.g., by including the URL for the webpage) and potentially a unique identifier for the client system that sent the message. When a message is received at the collection server 130, a record may be generated for the received message. The record may indicate an identifier (e.g., the URL) of the webpage accessed by the client system, the unique identifier for the client system, a time at which the client system accessed the webpage (e.g., by including a time stamp of when the message was received by the collection server 130), and a network address, such as an IP address, of the client system that accessed the webpage. The collection server 130 may then aggregate these records and store the aggregated records in the database 132 as site centric data 132b.

The beacon messages are generally sent regardless of whether or not the given client system has the panel application installed. But, for client systems in which the panel application is installed, the panel application also records and reports the beacon message to the collection server 130. For example, if the panel application is recording HTTP traffic, and the beacon message is sent using an HTTP Post message (or as a result of an <img> tag), then the beacon message is recorded as part of the HTTP traffic recorded by the panel application, including, for instance, any cookies that are included as part of the beacon message. Thus, in this instance, the collection server 130 receives the beacon message as a result of the beacon code, and a report of the beacon message as part of the panel application recording and reporting network traffic.

Because the beacon message is sent regardless of whether the panel application is installed, the site centric data 132b directly represents accesses by the members of the larger universe to be measured, not just the members of the panel. As a result, for those web pages or groups of web pages that include the beacon code, the site-centric data 132b may serve as the baseline for generating audience measurement data. However, for various reasons, this initial data may include some inaccuracies. As described further below, the panel-centric data 132a can be used to determine adjustment factors that may increase the accuracy of the site-centric data.

Figure 3:
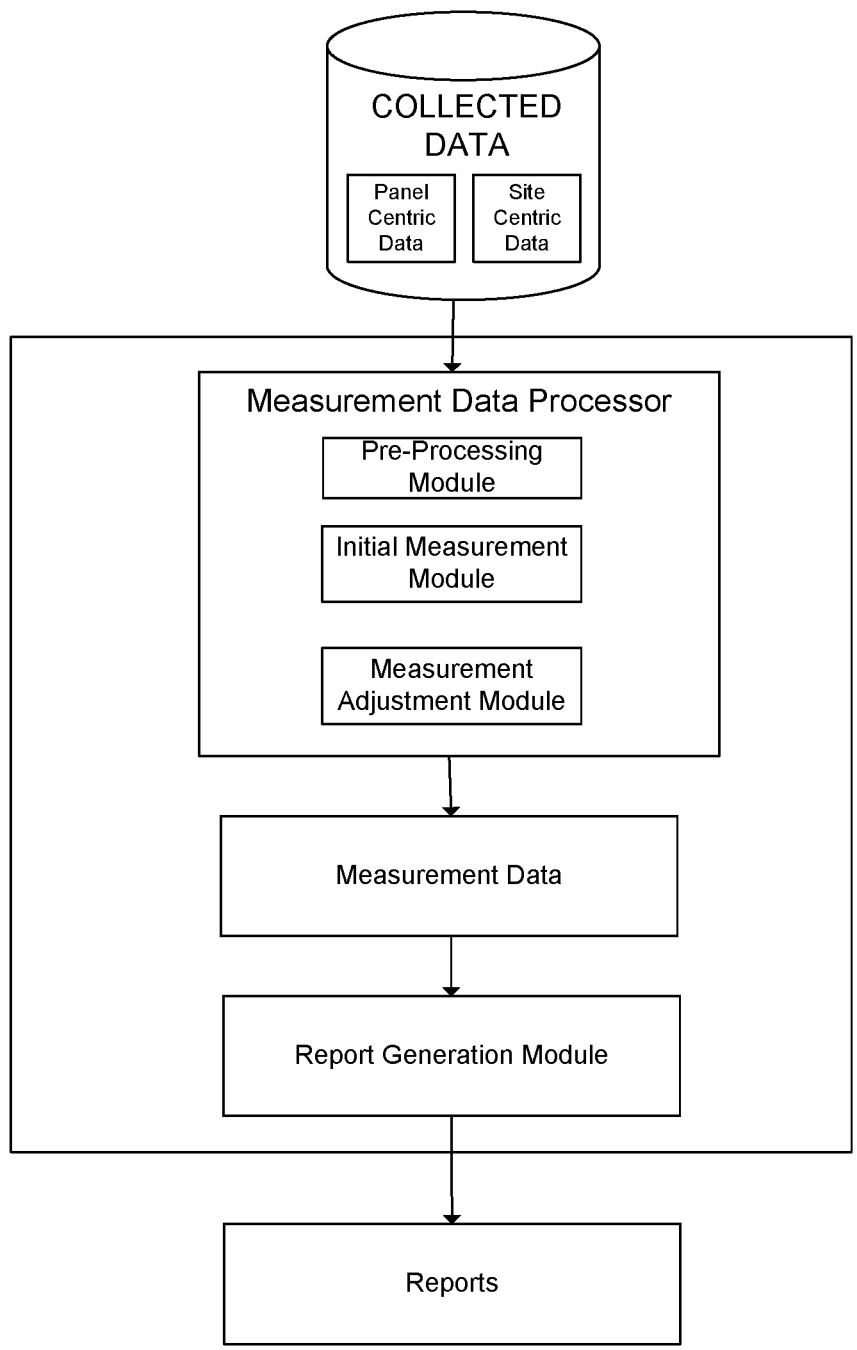
FIG. 3 illustrates an example of a system in which panel centric data and site centric data can be used to generate measurement data.

FIG. 3 illustrates an example of a system 300 in which panel centric data 132a and site centric data 132b can be used to generate measurement data 306. The system 300 includes a reporting server 302 The reporting server 302 may be implemented using, for example, a general-purpose computer capable of responding to and executing instructions in a defined manner, a personal computer, a special-purpose computer, a workstation, a server, or a mobile device. The reporting server 302 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 302.

The reporting server 302 executes instructions that implement a measurement data processor 304 and a report generation module 308. The measurement data processor 304 includes a pre-processing module 304a, an initial measurement module 304b, and a measurement adjustment module 304c. The measurement data processor 304 may implement a process, such as that shown in FIG. 4, to generate unified or adjusted measurement data 306 based on the panel centric data 132a and the site centric data 132b. The report generation module 308 may use the unified or adjusted measurement data 306 to generate one or more reports 310 that include information regarding client system accesses of one or more resources.

Figure 4:
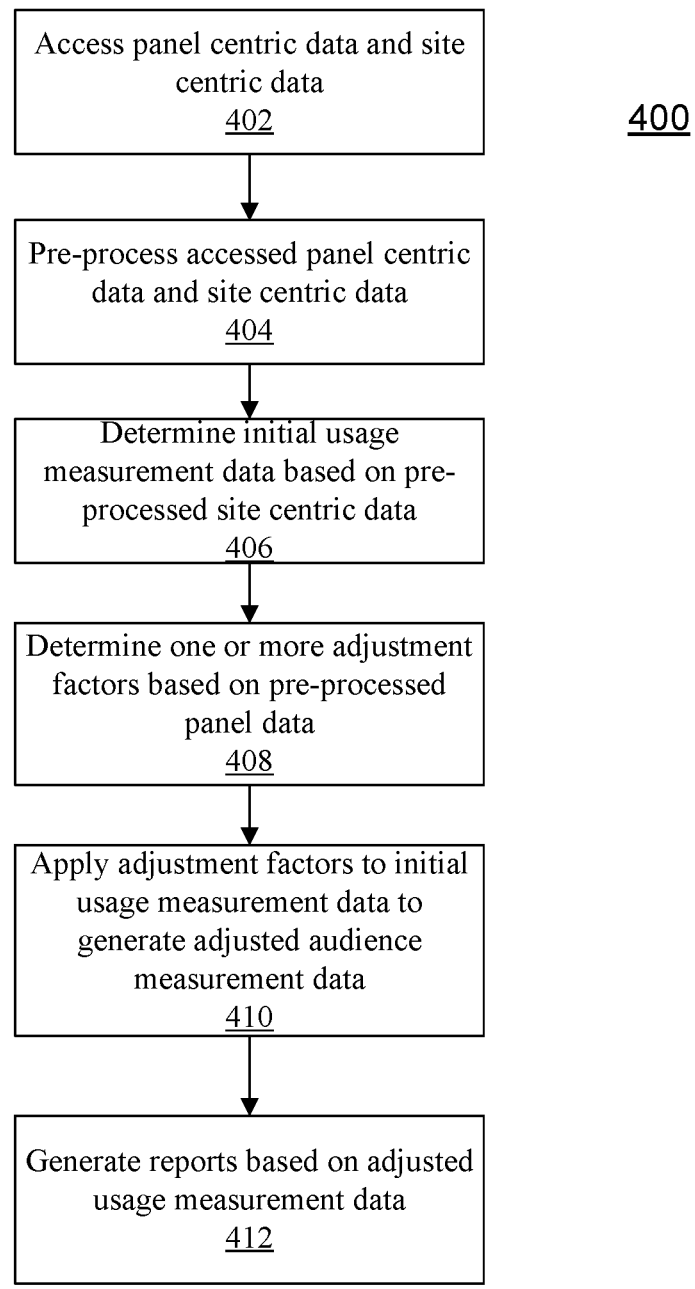
FIG. 4 is a flow chart illustrating an example of a process for determining audience measurement reports for a given web page or collection of web pages.

FIG. 4 is a flow chart illustrating an example of a process 400 for determining audience measurement reports for a given web page or collection of web pages. The following describes process 400 as being performed by the pre-processing module 304a, the initial measurement module 304b, the measurement adjustment module 304c, and the report generation module 308. However, the process 400 may be performed by other systems or system configurations.

The pre-processing module 304a accesses the panel centric data 132a and site centric data 132b (402). As described above, the panel centric data 132a indicates a first set of resources accessed by a first set of client systems (those in the panel) and the site centric data 132b indicates a second set of resources accessed by a second set of client systems. Some of the second set of client systems are potentially in the panel and some of the second set of client systems are potentially not in the panel. Further, the second set of resources may include one or more resources that are also included in the first set of resources.

The panel centric data 132a may include records that reflect the URLs or other identifiers of web pages or other resources accessed, the times those pages or resources were accessed, identifiers of the client systems that accessed the resources, and information about the requests and responses used to access the resources (for example, cookies sent in requests and/or received in the responses). The site centric data 132b may include records that reflect a URL or other identifier of a resource that has been accessed by a client system, a network address of the client system that accessed the resource, a time that the client system accessed the resource (for example, as reflected by a time stamp of the time at which the beacon message was received by the collection server 130), and a unique identifier for the client system that accessed the resource (for example, included in a cookie attached to the beacon message).

The panel centric data 132a and the site centric data 132b that is accessed by the pre-processing module 304a may be the data that is aggregated for a certain, previous time period. For example, the accessed data may be the panel centric data 132a and the site centric data 132b aggregated over the previous 30 days.

The pre-processing module 304a performs one or more pre-processing functions on the accessed panel centric data 132a and the accessed site centric data 132b (404). For example, the pre-processing module 304a may process the raw panel centric data 132a to form state data that represents the complete fact of usage in a single record. For instance, for web page visitation, a record in the state data may indicate that a particular user, on a particular date, at a particular time, accessed web page B (as represented by the URL for that web page), using a particular client system. The pre-processing module 304a also may match some or all of the URLs in the records of the state data to patterns in a dictionary of the Internet, which may organize various different URLs into digital media properties, reflecting how Internet companies operate their businesses. Each pattern may be associated with a web entity, which may be a web page or collection of web pages that are logically grouped together in a manner that reflects how Internet companies operate their business. For example, the various web pages that are included in the finance.yahoo.com domain may be logically grouped together into a single web entity (e.g., Yahoo Finance). The dictionary may include a number of hierarchically web entities to reflect various Internet media companies and how those companies arrange their web properties. For example, the Yahoo Finance web entity may be considered a subset of the Yahoo web entity, which may cover all of the various web pages included in the yahoo.com domain. The Yahoo web entity may include other web entities, such as a Yahoo Health web entity (associated with the various web pages in the health.yahoo.com domain). The pre-processing module 304a may associate a given state record with the lowest-level web entity associated with the pattern matching the URL in the state record.

The pre-processing module 304a may also remove from the panel centric data 132a records for users that are not to be included in the reporting sample. For example, there may be rules that are evaluated to insure that a complete record of a user's usage and non-usage during the reporting period is received. If those rules are not met, the user may be removed from the reporting sample. Also, a user may be removed if he or she does not meet certain criteria, such as being in a particular geographic area.

In addition, the pre-processing module 304a may remove certain types of records. For instance, records that reflect redirects or that reflect non-human initiated request (e.g., requests made as part of rendering a web page) may be removed.

The pre-processing module 304a may process the site centric data 132b to also match some or all of the URLs in the records of the site centric data 132b to patterns in the dictionary so as to associate the records with a web entity, such as the lowest level web entity in a hierarchy. The actions 406 to 410 may then be performed on a per-web-entity basis to determine the measurement data 306. For example, actions 406 to 410 may be performed for each of the lowest-level web entities, or may be performed for one or more higher level web entities, with the dictionary being used to collect the data associated with all of the lowest-level web entities included in the higher level web entity.

In addition, the pre-processing module 204a may remove certain records from the site centric data 132b. For example, the pre-processing module 304a may remove records that reflect non-human initiated accesses from the site centric data 132b. For example, a list of known search index crawlers or other robots may be used to remove records that reflect accesses from those bots. Additionally, or alternatively, if the records indicate that sequential accesses to the same or different web pages in a web entity by a particular client system occur at a defined frequency (for example, if the accesses are spaced three seconds apart or less), then accesses subsequent to the first one may be removed. This may help to remove records from non-human initiated accesses, as well as errors associated with the beacon code that may result in more than one beacon message per access.

In some implementations, records for certain types of client system devices may be removed. For instance, records for mobile devices may be remove. In some implementations, such records may be detected based on user agent data sent with the beacon message and recorded in the record. In addition, records may be removed for client systems not in a particular geographic area (e.g., if the reports are being generated for a particular geographic area, such as North America). The country and region of the client system corresponding to the record may be determined based on a reverse lookup of the network address (e.g., a reverse lookup of the IP address). Similarly, shared use client systems (e.g., client systems available to the public in a library) may be detected by analyzing the network access provider based on a reverse look-up of the client system's IP address (which may be captured with the beacon message).

Pre-processing of both the panel centric data 132a and the site centric data 132b may also involve delineating between classes of client systems. At times, it may be desirable to segment reports according to classes of client systems. For example, in one implementation, the reports and underlying data, at least initially, are segmented into work vs. home client systems, with home client systems being those that are used at home while work client systems are those used at work. These two subpopulations can be identified and separated in the panel centric data 132a because users self-identified the machines as home or work (or another class) when registering. To identify and separate these two sub-populations in the site-centric 132b, the beacon messages received between 8 am and 6 pm local time Monday through Friday may be assumed to be work generated traffic. All other traffic may be aligned as targets for the Home sample.

In another example for identifying and separating these two subpopulations in the site centric data 132b, a model may be developed based on observed work behavior in the panel centric data 132a. This model may be based on time of day and day of week usage profiles. If an IP address matches the expected profile for a work machine, all traffic for that IP address may be considered work traffic. For instance, panel data may indicate that, if the number of accesses during a first time period (a work time) is greater than the number of accesses during a second time period (a home time period) by a certain amount, then a machine is probably a work machine. This information may be used, together with the site-centric data, to classify network access providers into work or home based on the whether or not accesses by users of those network access providers are greater during the work time than the home time, on average, by the certain amount. The network access provider of a given machine may then be determined based on that machine's IP address, and that machine may be classified as the same class as the network access provider. Such techniques are described, for example, in U.S. Application Ser. No. 61/241,576, filed Sep. 11, 2009, and titled "Determining Client System Attributes."

Actions 406 to 410 then may be separately performed on the data in each subpopulation, thereby generating measurement data for the home population and measurement data for the work population. Reports then may be generated for each of these subpopulations separately, or a combined reports may be generated, as further described with respect to action 412. Other implementations may similarly divide among several subpopulations.

The initial measurement module 304b determines initial usage measurement data based on the pre-processed site centric data (406). For example, the initial measurement module 304b may determine an initial measurement of unique visitors for a given web entity. Unique visitors may represent the number of unique people that requested and/or viewed one of the web pages of the web entity. To determine the initial measurement of unique visitors, for instance, the initial measurement module 304b may count the number of unique cookies (that is, number of cookies with a different unique identifier) received as part of the beacon messages received for the web entity.

As another example, the initial measurement module 304b may determine an initial measurement of page views for a given web entity. Page views may represent the number of times the web pages for a web entity were requested and/or viewed (regardless of whether the web pages were requested or viewed by a unique person). In this case, the initial measurement module 304b may count the total number of beacon messages received for the web entity.

The measurement adjustment module 304c determines one or more adjustment factors based on the pre-processed panel centric data (408). The initial audience measurement data, determined based solely on the pre-processed site centric data, may not be accurate for a number of reasons. The pre-processed panel centric data may be used to determine adjustment factors to correct the inaccuracies.

For example, if the initial measurement of unique visitors is based on cookies received with the beacon measurements, then there may be over or under counting of unique visitors because the cookies are set on a machine and browser basis, and not a person basis. In other words, even though multiple people may use a particular client system, only a single cookie may be set and counted for a given machine and browser. This may result in the undercounting of unique visitors.

In addition, a previously set cookie on a client system may be deleted, resulting in a new cookie and new identifier being set for further accesses during the reporting time period. As a result, accesses by the same user may be mistakenly identified as accesses from two different users, which may result in the overcounting of unique visitors. Similarly, a user may use multiple browsers, with different cookies being set for each browser. As a result, there may be multiple, different cookies for a single user because that user uses different browsers on the same machine. This may result in overcounting of unique visitors.

To account for such inaccuracies in the site centric data 132b, a cookie-per-person adjustment factor may be determined based on the pre-processed panel centric data. This adjustment factor may be determined on a web entity basis. This cookie-per-person adjustment factor may reflect the number of cookies that are set per person visiting beaconed web pages (that is, web pages that include the beacon code) of the web entity. As a result, this adjustment factor may be used to adjust the total count of unique visitors to compensate for multiple cookies per person or, conversely, multiple persons per cookie. This adjustment factor may be determined, for example, by using process 500 described with respect to FIG. 5.

Also, a given user may have and use multiple client systems in a given location (for example, at home). As a result, separate cookies may be set on the multiple client systems, and counted, even though only a single user is visiting the web entity. This may lead to an overcounting of unique visitors. To account for this inaccuracy, a machine overlap adjustment factor may be determined based on the pre-processed panel centric data. This adjustment factor may be determined on a web entity basis. This machine overlap adjustment may reflect the number of client systems being used per person that visits the web entity and can, therefore, adjust the total count of unique visitors to adjust for multiple cookies per person that result from a person using more than one client system to visit the web entity. This adjustment factor may be determined, for example, by using process 600 described with respect to FIG. 6.

Furthermore, if the initial measurement of unique visitors or page views is based on receiving a beacon message from beacon code included in the web pages for the web entity, there may be undercounting of either of these measurements as a result of beacon code not being included on all of the web pages for a given web entity. This may be the result of incorrect implementation of the beacon code (for example, the beacon code is not properly placed on all web pages that are part of the web entity), or not possible for certain policy reasons. For example, one lower level web entity may choose to include beacon code on all of the web pages for that entity, while another lower level web entity may choose to not include beacon code at all. If those lower level web entities are underneath the same higher level web entity, then the beacon code can not be implemented on all of the web pages for the higher level entity since one of the lower level entities has chosen to not include beacon code. As a particular example, the MSN® website (msn.com) and the Hotmail® website (hotmail.com) may both be separate web entities under the higher level web entity designated as Microsoft®. However, these two websites may be separately operated and managed and, therefore, MSN®, for instance, may choose to beacon while Hotmail® does not. As a result, the initial audience measurement data (either page views or unique visitors) for the web entity Microsoft® does not include any counts for the Hotmail® webpages since Hotmail® does not include beacon code on the web pages for Hotmail®.

To account for inaccuracies in the page views or unique visitors that result from a failure to include beacon code in all of the web pages for a given web entity, a non-beaconed adjustment factor may be determined based on the pre-processed panel centric data. This adjustment factor may be determined on a web entity basis. Since, ideally, the panel applications capture all web traffic, visits to non-beaconed web pages for a given entity are also captured and reported by the panel applications. Thus, the pre-processed panel centric data may be used to determine a non-beaconed adjustment factor that reflects the number of page views or unique visits to web pages for the web entity that are not counted based on the beacon messages. This adjustment factor may be determined, for example, by using process 700 described with respect to FIG. 7.

The measurement adjustor module 304c applies the adjustment factors to the initial usage measurement data to generate adjusted usage measurement data 306 (410). For instance, in one implementation for audience measurement data that reflects unique visitors for a given web entity, the measurement adjustor module 304c may generate adjusted unique visitors data as follows:

$$\text{Adj UVs} = ((\text{Init UVs}/\text{Cookie-Per-Person})*\text{Machine Overlap}) + \text{Non-Beaconed}$$

where Adj UVs is the adjusted unique visitors count, Init UVs is the initial count of unique visitors based on the pre-processed site centric data, Cookie-Per-Person is the cookie-per-person adjustment factor, Machine Overlap is the machine overlap adjustment factor, and Non-Beaconed is the non-beaconed adjustment factor. The reciprocal of the Cookie-Per-Person adjustment factor (a Person-Per-Cookie adjustment factor) may be used by multiplying this factor times the Init UVs, rather than dividing.

As another example, in one implementation for audience measurement data that reflects the total page views of web pages for a given web entity, the measurement adjustor module 304c may generate adjusted page views data as follows:

Adj PageViews=Init PageViews+Non-Beaconed where Adj PageViews is the adjusted page views count, Init PageViews is the initial page views count based on the pre-processed site centric data, and Non-Beaconed is the non-beaconed adjustment factor.

The report generation module 308 generates audience measurement reports based on the adjusted audience measurement data (412). For example, in an implementation in which the initial data is delineated between home and work client systems, the report generation module 308 may generate reports on unique visitors or page views for a given web entity for one or both of the home or work populations. Additionally, or alternatively, in such an implementation, the report generation module 308 may generate reports on unique visitors or page views for a given web entity that combine the home and work populations. In other words, the report generation module may combine the page views for the home and work populations into a combined count of page views and/or may combine the unique visitors for the home and work populations into a combined count of unique visitors.

In some implementations, when the report generation module 308 produces a combined count of unique visitors, the report generation module takes into account the number of users that are present in both the home and work populations. In some cases, a person may visit a web page for the web entity from both a home client system and a work client system. As a result, if the count of the user in the home population was simply added to the count of the user in the work population, then the user would be counted twice. The report generation module 308 may use panel centric data 132a to determine the amount of user overlap between the two populations, and remove duplicate counts. For instance, a number of users may install the monitoring application on both work client systems and home client systems, and designate each one as such. Therefore, the data resulting from these users can be used to estimate the number of people that visit the web pages for the web entity using both home and work client systems, and this information can be used to de-duplicate those users in the combined count of unique visitors.

Figure 5:
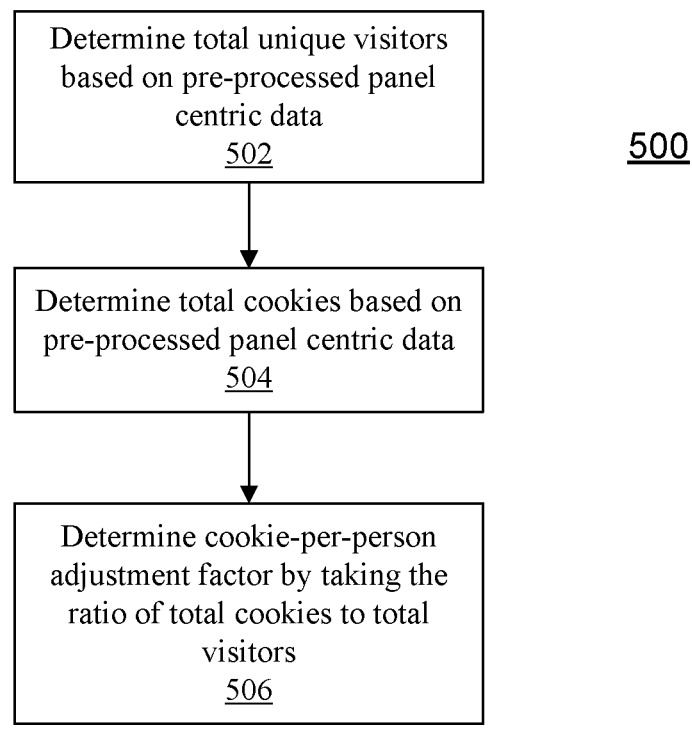
FIG. 5 is a flow chart illustrating an example of a process for determining a cookie-per-person adjustment factor.

FIG. 5 is a flow chart illustrating an example of a process 500 for determining a cookie-per-person adjustment factor. The following describes process 500 as being performed by the measurement adjustment module 304c. However, the process 500 may be performed by other systems or system configurations. As noted above, this adjustment factor may be used to adjust the initial audience measurement data for a given web entity. Thus, the following describes an implementation of process 500 in which the actions 502 to 506 are performed on a web entity basis.

The measurement adjustment module 304c determines, based on the pre-processed panel-centric data, a count of the total number of unique visitors that visited one of the beaconed web page of a given web entity (502). For instance, the total number of unique visitors may be determined by determining which members in the pre-processed panel have an associated beacon message as a result of visiting a web page of the web entity, and adding up the projection weights for each of these members. The projection weight for a given member may be the number of individuals that member represents in the total universe and, therefore, adding the projection weights for each of the determined members may provide the total number of individuals in the total universe that visited one of the beaconed web page of the web entity.

The measurement adjustment module 304c determines, based on the pre-processed panel-centric data, a count of the total number of beacon cookies for a given web entity (504). For example, the measurement adjustment module 304c may determine the client systems in the pre-processed panel centric data that accessed a beaconed web page of the web entity. For each of those client systems, the measurement adjustment module 304c may then determine the number of different cookies sent with the beacon messages (also referred to as "beacon cookies") from the client system during the reporting period. As described above, for client systems in which the panel application is installed, the panel applications can also record and report the beacon message and any associated cookie (beacon cookie). For each of those client systems, the measurement adjustment module 304c then may generate a projected cookie count for the client system by applying the projection weight for the user of the client system to the number of different beacon cookies sent by the client system during the reporting period. The measurement adjustment module 304c then adds the projected cookie counts together to determine a count of the total number of beacon cookies for the web entity. If there is more than one user of a given client system, the projection weights for those users may be averaged and the averaged weight may be applied to the count of different beacon cookies for that client system to determine the projected cookie count.

Once the total unique visitors and total cookies for a given web entity are determined, the measurement adjustment module 304c determines the cookie-per-person adjustment factor by taking the ratio of total cookies to total unique visitors. In other words, the measurement adjustment module 304c determines Cookie-Per-Person as:

Cookie-Per-Person=Total Cookies/Total Unique Visitors where Total Cookies is a count of the total number of beacon cookies for the web entity and Total Unique Visitors is a count of the total number of unique visitors for the web entity. As noted above, the reciprocal of the Cookie-Per-Person adjustment factor (Person-Per-Cookie) may be used. The Person-Per-Cookie factor may be determined by determining Total Unique Visitors/Total Cookies.

Figure 6:
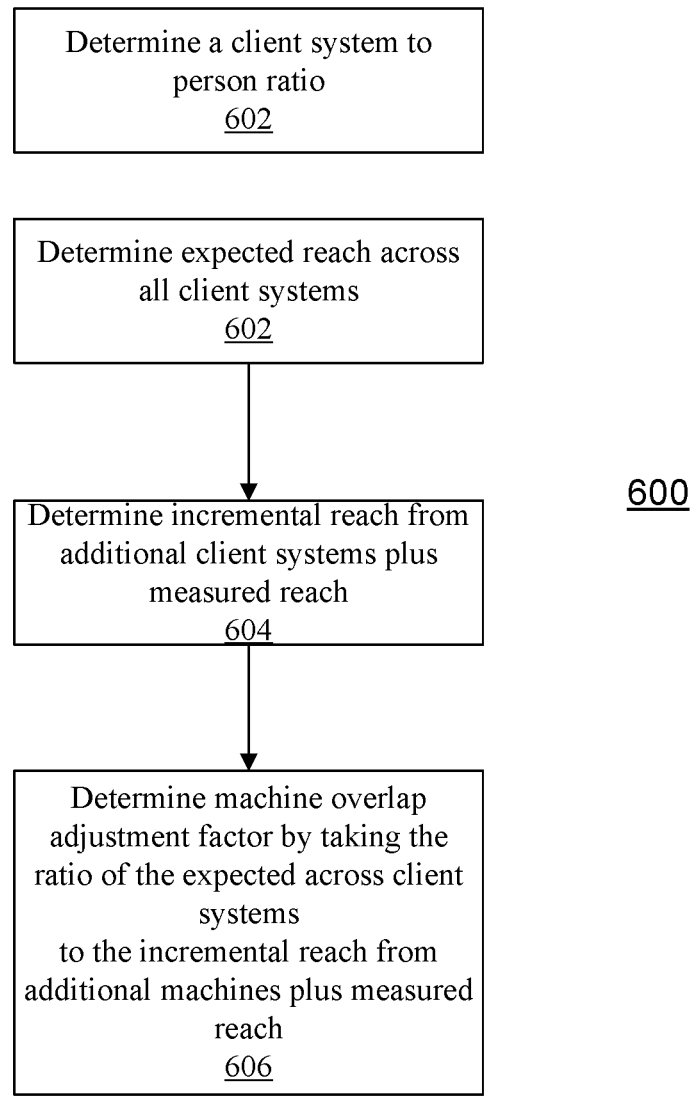
FIG. 6 is a flow chart illustrating an example of a process for determining a machine overlap adjustment factor.

FIG. 6 is a flow chart illustrating an example of a process 600 for determining a machine overlap adjustment factor. The following describes process 600 as being performed by the measurement adjustment module 304c. However, the process 600 may be performed by other systems or system configurations. As noted above, this adjustment factor may be used to adjust the initial audience measurement data for a given web entity. Thus, the following describes an implementation of process 600 in which the actions 602 to 606 are performed on a web entity basis.

The measurement adjustment module 304c determines, based on the pre-processed panel-centric data, a client system to person ratio for a given web entity (602). As described above, a given user may have and use multiple client systems in a given location (for example, at home). As a result, separate cookies may be set on the multiple client systems, and counted, even though only a single user is visiting the web entity. Based on the pre-processed panel centric data, a client system to person ratio for a given web entity can be determined for the entire universe of users and client systems being measured (e.g., the universe of all Internet users and client systems, or those in a particular geographic region). To determine the client system to person ratio for a given web entity, the measurement adjustment module 304c may determine the total number of client systems in the defined universe that accessed the web pages of the web entity and the total number of users in the defined universe that accessed the web pages of the web entity, and then determine the ratio of these two numbers.

As described above, there may be projection weights for projecting users to the total number of Internet users (or Internet users in a particular geographic region), or other defined user universe, as well as projection weights for projecting client systems to the total universe of client systems accessing the Internet (or, at least, the total in a particular geographic region), or other defined client system universe. Thus, to determine the total number of client systems in the defined universe that accessed the web pages of the web entity, the measurement adjustment module 304c may determine the client systems in the pre-processed panel centric data that accessed web pages of the web entity during the reporting period, and add up the projection weights for those client systems to determine the total number of client systems in the defined universe that accessed the web pages of the web entity. Similarly, to determine the total users, the measurement adjustment module 304c may determine the users in the pre-processed panel centric data that accessed web pages of the web entity during the reporting period, and add up the projection weights for those users to determine the total number of users in the defined universe that accessed the web pages of the web entity.

Based on the client system to person ratio, the measurement adjustment module 304c determines the expected reach based on all of the panelists in the pre-processed panel centric data across all of the client systems on which those panelists are active (604). In general, reach is the percentage of users, out of the total universe of users, that visited a web page of a given web entity during a certain period, such as the reporting period. In other words, reach is the percentage of the total possible visitors that visited a web page of the web entity.

The expected reach based on all panelists across all client systems on which they are active may be calculated using:

$$\frac{pRE}{1+(E-1)p^{\ln\left(\frac{E-1}{S-1}\right)/\ln(T)}} \text{ Or } \frac{(1+q)RE}{1+(E-1)(1+q)^{\ln\left(\frac{E-1}{S-1}\right)/\ln(T)}}$$

where:
p=the client system to person ratio, or $$\frac{M_p}{P_p};$$

q=the incremental number of client systems used by people=(p−1), assuming no shared use machines such that people use at least one machine;
T=the reporting period measured in days (e.g., 30 days);
R=the projected reach over the reporting period T;
E=the frequency of visitations per visitor to a web page of the web entity during period T;
S=the average visits to a web page of the web entity per day during period T.

The projected reach, R, over the reporting period T may be determined by using the pre-processed panel centric data to determine the projected number of users that visited a web page of the web entity during the reporting period and dividing that value by the total estimated universe of users. The frequency of visitations per visitor to a web page of the web entity, E, may be determined by using the pre-processed panel centric data to determine the total visits to a web page of the web entity during the reporting period and the total visitors to a web page of the entity during the reporting period, and then dividing those two numbers. The average page visits to a web page of the web entity per day, S, may be determined by using the pre-processed panel centric data to determine the total number of unique visits in each day of the reporting period, add these values together, and then divide by the total number of days in the reporting period.

Based on the client system to person ratio, the measurement adjustment module 304c determines the incremental reach not measured due to the client systems used by members of the panel, but not included in the panel plus the reach, R, measured by the panel (506). This expected reach gain from the incremental machine activity not measured by the panel can be determined using:

$$\frac{qRE}{1+(E-1)q^{\ln\left(\frac{E-1}{S-1}\right)/\ln(T)}}$$

This incremental reach can then be added to the measured reach, R.

The measurement adjustment module 304c determines the machine overlap adjustment factor by determining the ratio of the expected reach across all client systems to the incremental reach plus measured reach (508). In other words, the measurement adjustment module 304c may determine the machine overlap adjustment factor based on the following:

$$\frac{\frac{(1+q)RE}{1+(E-1)(1+q)^{\ln\left(\frac{E-1}{S-1}\right)/\ln(T)}}}{R+\frac{qRE}{1+(E-1)q^{\ln\left(\frac{E-1}{S-1}\right)/\ln(T)}}}$$

Which simplifies to:

$$\frac{\frac{(1+q)E}{1+(E-1)(1+q)^{\ln\left(\frac{E-1}{S-1}\right)/\ln(T)}}}{1+\frac{qE}{1+(E-1)q^{\ln\left(\frac{E-1}{S-1}\right)/\ln(T)}}}$$

As an alternative to first calculating the expected reach, calculating the incremental reach plus measured reach, and then dividing the two, the measurement adjustment module 304c may determine the machine overlap adjustment factor based directly on the simplified equation above. For instance, the measurement adjustment module 304c may determine the client system to person ratio as described above, determine the incremental number of client systems used by people based on the machine to person ratio (e.g., by determining p−1), determine the frequency of visitations per visitor to a web page of the web entity as described above, determine the average visits to a web page of the web entity per day as described above, and then determine the machine overlap adjustment factor based on q, E, S, and T using the simplified equation above.

Moreover, if the composition of users and client systems in the defined universe is estimated accurately and taken into account correctly when determining projection weights for the users and client systems in the panel, then the client system to person ratio may be used directly as the machine overlap adjustment factor. However, such perfect estimating and weighting may be very difficult to accomplish. For instance, there may be a mix of primary (those used by a user most often to access the Internet) and secondary (those use less often) machines in the panel, but the exact mix may not be known. So, depending on the sample composition and the site, the client system to person ratio may be skewed more towards secondary usage or primary usage. To compensate for such errors, the client system to person ratio may be used as described above with the expected and incremental reaches to determine a machine overlap adjustment factor that compensates for the possible errors in estimating the universe and weighting. If the simplified equation above is used and the expected combined reach is greater than the addition of incremental reach to measured reach, the sample is skewed more towards secondary usage for the web entity and the machine overlap factor will scale up unique visitors. On the other hand, if the expected combined reach is less than the addition of incremental reach to measured reach, then the sample is skewed more towards primary usage and the machine overlap adjustment factor will scale down unique visitors to account for incremental secondary usage.

Figure 7:
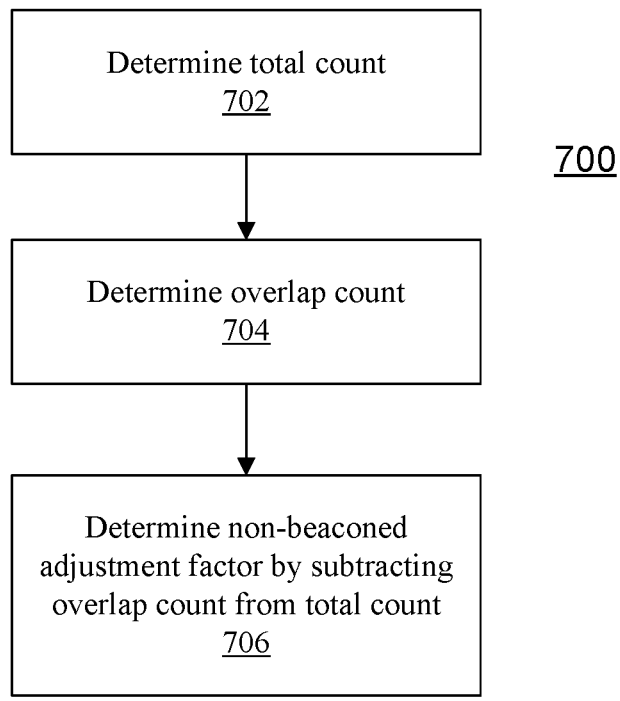
FIG. 7 is a flow chart illustrating an example of a process for determining a non-beaconed adjustment factor.

FIG. 7 is a flow chart illustrating an example of a process 700 for determining a non-beaconed adjustment factor. The following describes process 700 as being performed by the measurement adjustment module 304c. However, the process 700 may be performed by other systems or system configurations. As noted above, this adjustment factor may be used to adjust the initial audience measurement data for a given web entity. Thus, the following describes an implementation of process 700 in which the actions 702 to 706 are performed on a web entity basis.

The measurement adjustment module 304c, depending on the particular audience measurement, determines a total count of the unique visitors or page views for a given web entity based on the pre-processed panel-centric data (702). As described above, since, ideally, the panel applications capture all web traffic, visits to non-beaconed web pages for a given web entity are also captured and reported by the panel applications. As a result, the measurement adjustment module 304c may use the pre-processed panel data to determine a total count of the unique visitors or page views for a given web entity, even if all of the web pages for a web entity do not include beacon code.

For instance, the total number of unique visitors may be determined by adding up the projection weights for each of the members of the panel in the pre-processed panel centric data that visited a web page of the web entity. The total number of page views may be determined, for instance, by applying each member's projection weight to the count of page views for the member to generate a projected page views for the member, and then adding together all of the projected page views.

The measurement adjustment module 304c, depending on the particular audience measurement, determines an overlap count of the unique visitors or page views for a given web entity, based on the pre-processed panel-centric data (704). An overlap count of the unique visitors or page views are the number of unique visitors or page views attributable to visits to web pages that included the beacon code. To determine the overlap count of unique visitors, the measurement adjustment module 304c, for example, may add together the projection weights for members in the pre-processed panel centric data that visited a web page of the web entity and that sent a beacon message with a beacon cookie. To determine the overlap count of page views, the measurement adjustment module 304c, for example, may determine the members in the pre-processed panel centric data that visited a web page of the web entity and that sent a beacon message with a beacon cookie, determine the number of page views for each of those members, apply the projections weights for each member to the respective number of page views for the member to generate projected page views, and then add together the projected page views to obtain a total overlap count of page views.

The measurement adjustment module 304c, depending on the particular audience measurement, determines a non-beaconed adjustment factor by subtracting the total count of the unique visitors or page views for a given web entity from the overlap count of unique visitors or page views for the web entity (706). As noted above, the non-beaconed adjustment factor is used to adjust for the non-beaconed web pages. Thus, the overlap count is removed from the total count of unique visitors or page views (which includes unique visitors or page views for both web pages with beacon code and web pages without beacon code) to arrive at an adjustment factor that reflects unique visitors or page views attributable only to those web pages of the web entity that do not contain beacon code. In other words, Non-Beaconed is determined based on:

$$\text{Non-Beaconed} = \text{Total Count} - \text{Overlap Count}$$

where Total Count is the projected total count of unique visitors or page views for the web entity (for both beaconed and non-beaconed pages) based on the pre-processed panel centric data and Overlap Count is the projected count of unique visitors or page views attributable to web pages of the web entity that include beacon code.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A system, comprising:
a plurality of client systems configured to access resources on a network;
a first server system comprising one or more processors and one or more storage devices storing instructions that, when executed by the one or more processors, cause the one or more processors to perform the following operations:
receive a first set of information from a first subset of the client systems as a result of the first subset of the client systems accessing a first set of resources on a network, the first set of information being sent as a result of beacon instructions included with the first set of resources;
store a first set of usage data for the first set of resources, the first set of usage data having been determined based on the first set of information received from the first subset of the client systems;
receive a second set of information from monitoring applications installed on a second subset of the client systems that accessed a second set of resources, wherein users of the second subset of client systems are a sample of a larger group of users that use resources on the network, and wherein the second set of resources includes one or more common resources that are included in the first set of resources; and
store a second set of usage data for the second set of resources, the second set of usage data being determined based on the second set of information received from the second subset of the client systems, wherein the second set of usage data includes information about cookies stored by the second subset of client systems; and
a second server system comprising one or more processors and one or more storage devices storing instructions that, when executed by the one or more processors, cause the one or more processors to perform the following operations:
access usage measurement data determined based on the first set of usage data for the first set of resources;
access the second set of usage data for the second set of resources;
determine, based on the second set of usage data and not based on the first set of usage data, one or more adjustment factors associated with a characteristic present in the second set of usage data and not present in the first set of usage data;
apply the one or more adjustments factors to the usage measurement data to generate adjusted usage measurement data; and
generate one or more reports based on the adjusted usage measurement data.

2. The system of claim 1, wherein the first set of information received from the first subset of the client systems includes, for each of the client systems in the first subset, one or more beacon messages that identify the first set of resources and a beacon cookie with a unique identifier for the client system.

3. The system of claim 2, wherein the accessed usage measurement data is determined by determining an initial count of unique visitors that accessed the first set of resources during a time period by determining a count of the received one or more beacon messages that identify the first set of resources and that include beacon cookies with different unique identifiers.

4. The system of claim 1, wherein the one or more adjustment factors include a non-beaconed adjustment factor that reflects a number of unique visitors that accessed one or more resources that are included in the second set of resources but not included in the first set of resources.

5. The system of claim 4, wherein the non-beaconed adjustment factor is determined by determining a projected number of unique visitors that accessed the second set of resources, determining a projected number of unique visitors that accessed the first set of resources, and subtracting the projected number of unique visitors that accessed the first set of resources from the projected number of unique visitors that accessed the second set of resources.

6. A system, comprising:
a plurality of client systems configured to access resources on a network;
a first server system comprising one or more processors and one or more storage devices storing instructions that, when executed by the one or more processors, cause the one or more processors to perform the following operations:
receive a first set of information from a first subset of the client systems as a result of the first subset of the client systems accessing a first set of resources on a network, the first set of information being sent as a result of instructions, included with the first set of resources, that cause a client system executing the instructions to automatically send a message that includes the first set of information;
store a first set of usage data for the first set of resources, the first set of usage data having been determined based on the first set of information received from the first subset of the client systems;
receive a second set of information from monitoring applications installed on a second subset of the client systems that accessed a second set of resources, wherein users of the second subset of client systems are a sample of a larger group of users that use resources on the network, and wherein the second set of resources includes one or more common resources that are included in the first set of resources; and store a second set of usage data for the second set of resources, the second set of usage data being determined based on the second set of information received from the second subset of the client systems, wherein the second set of usage data includes information about unique identifiers stored by the second subset of client systems; and a second server system comprising one or more processors and one or more storage devices storing instructions that, when executed by the one or more processors, cause the one or more processors to perform the following operations:

access usage measurement data determined based on the first set of usage data for the first set of resources;

access the second set of usage data for the second set of resources;

determine, based on information about unique identifiers stored by the second subset of client systems included in the second set of usage data, one or more adjustment factors associated with a characteristic present in the second set of usage data and not present in the first set of usage data;

apply the one or more adjustments factors to the usage measurement data to generate adjusted usage measurement data; and generate one or more reports based on the adjusted usage measurement data.

7. The system of claim 6, wherein the first set of information received from the first subset of the client systems includes, for each of the client systems in the first subset, one or more messages that identify the first set of resources and a unique identifier for the client system.

8. The system of claim 7, wherein the accessed usage measurement data is determined by determining an initial count of unique visitors that accessed the first set of resources during a time period by determining a count of the received one or more messages that identify the first set of resources and that different unique identifiers.

9. The system of claim 7, wherein the one or more adjustment factors include an identifier-per-person adjustment factor that reflects a number of unique identifiers per person that accessed the first set of resources during the time period.

10. The system of claim 9, wherein the identifier-per-person adjustment factor is determined by determining a ratio of a projected total number of unique identifiers on the first subset of the client systems that accessed the first set of resources during the time period to a projected total number of people that accessed the first set of resources during the time period.

11. The system of claim 7, wherein the one or more adjustment factors include a person-per-identifier adjustment factor that reflects a number of persons that accessed the first set of resources during the time period per unique identifiers.

12. The system of claim 11, wherein the person-per-identifier adjustment factor is determined by determining a ratio of a projected total number of people that accessed the first set of resources during the time period to a projected total number of unique identifiers set on the first subset of the client systems that accessed the first set of resources during the time period.

13. The system of claim 6, wherein the one or more adjustment factors include a machine overlap adjustment factor that reflects a number of the client systems that were used to access the first set of resources during the time period per person that accessed the first set of resources during the time period.

14. The system of claim 13, wherein the machine overlap adjustment factor is based on one or more of an incremental number of client systems per person used to access the first set of resources during the time period, a frequency of accesses per person that accessed the first set of resources during the time period, and an average number of accesses to the first set of resources per day during the time period.

15. The system of claim 14, wherein the incremental number of client systems per person is determined based on a ratio of a total number of client systems that accessed the first set of resources during the time period to a total number of people that accessed the first set of resources during the time period.

16. The system of claim 6, wherein the one or more adjustment factors include a non-beaconed adjustment factor that reflects a number of unique visitors that accessed one or more resources that are included in the second set of resources but not included in the first set of resources.

17. The system of claim 16, wherein the non-beaconed adjustment factor is determined by determining a projected number of unique visitors that accessed the second set of resources, determining a projected number of unique visitors that accessed the first set of resources, and subtracting the projected number of unique visitors that accessed the first set of resources from the projected number of unique visitors that accessed the second set of resources.

* * * * *